> United States Patent Office 3,078,398
Patented Feb. 19, 1963

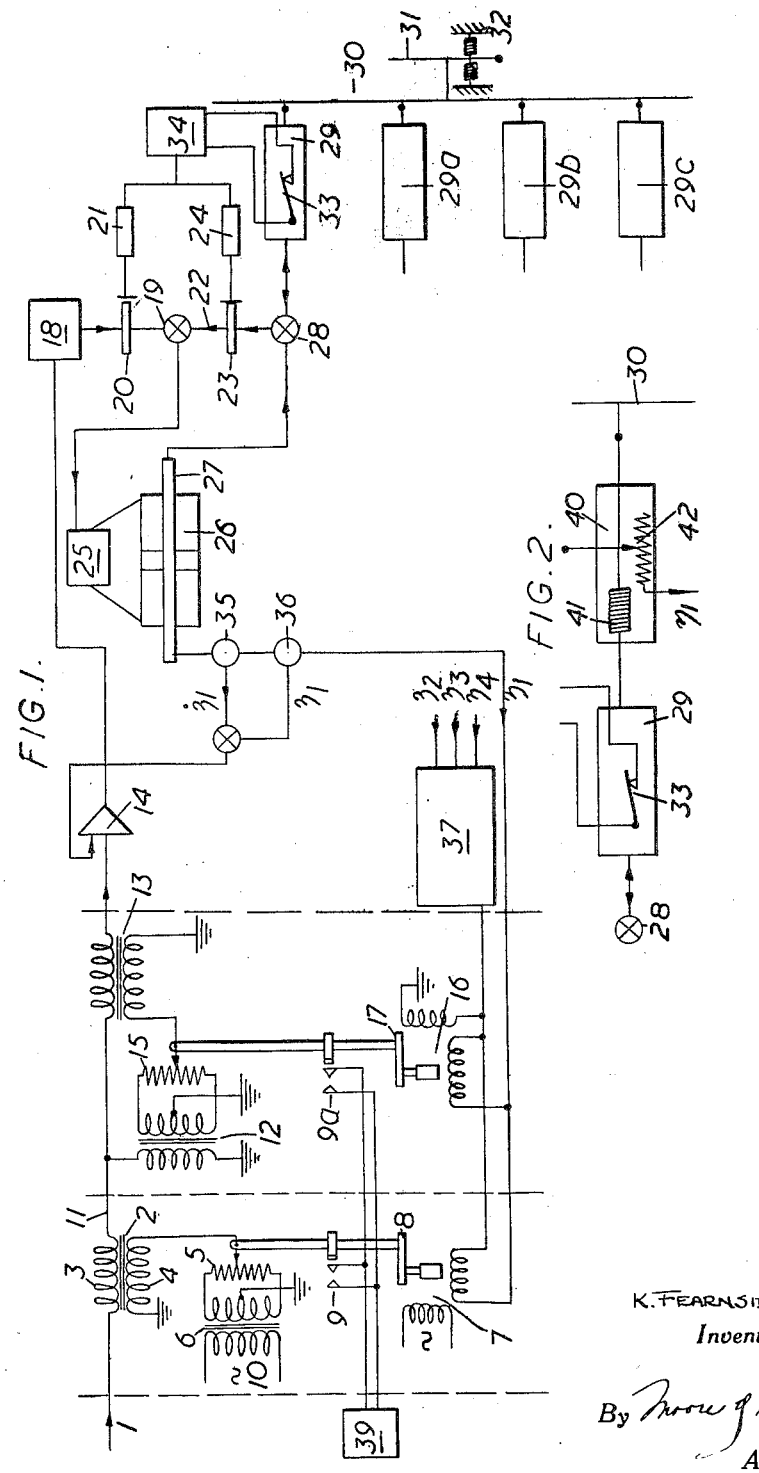

3,078,398
PLURAL CHANNEL SERVO SYSTEMS
Kenneth Fearnside, Causeway, Bredon, near Tewkesbury, England, assignor, by mesne assignments, to S. Smith & Sons (England) Ltd., London, England, a corporation of England
Filed July 27, 1959, Ser. No. 829,733
Claims priority, application Great Britain July 25, 1958
24 Claims. (Cl. 318—19)

The present invention relates to servo systems of the kind having a plurality of sub-channels operating corresponding outputs in accordance with a common demand quantity, the outputs of the corresponding sub-channels being required to be in substantial agreement. Such systems may be used where a large margin of safety is required, as in the actuation of aircraft control surfaces, which may be split into a number of parts operating in agreement, and it is required that failure of one sub-channel should not put the system out of action.

According to the present invention there is provided a servo system comprising a plurality of sub-channels having a common input to which a demand quantity may be applied, each sub-channel comprising an amplifying stage adapted to produce an output signal dependent on the demand quantity, an actuator, means to control the energization of the actuator having two operating conditions, in the first said condition being responsive to the output signal and in the second said condition being responsive to discrepancy between the output of the actuator and the output of the actuators of the other sub-channels, and means responsive to excess of the said discrepancy above some predetermined amount to cause the energization control means to assume their second condition.

Preferably the amplifying stages of the different sub-channels have variable gains, and means are provided to adjust their gains to substantial equality.

Preferably also the said amplifying stages have each a settable datum, and means are provided to set the said datums to correct for datum drift in the said stages.

Embodiments of the invention will now be described with reference to the accompanying drawings of which FIGURE 1 shows schematically one channel of a quadruplicated control system for the elevator of an aircraft, the elevator being divided into four sections each of which is normally controlled by one sub-channel of the system, and FIGURE 2 shows an alternative method of correcting gain and datum errors in the sub-channels.

An electric signal in accordance with the elevator movement required if a desired motion of the aircraft in the pitch plane is to be achieved is applied at terminal 1. The means whereby this signal is produced will comprise various devices responsive to motion of the aircraft in the pitch plane, such as gyroscopes and directional radio apparatus, but they form no part of the invention and will not be further discussed.

The electric signal is of a predetermined frequency and in phase (or antiphase) with a reference source 10. Terminal 1 is connected in series with the secondary 3 of a first transformer 2. The primary 4 of transformer 2 is fed from the slider 5 of a potentiometer connected across the secondary of a second transformer 6 having an earthed centre tap. The primary of transformer 6 is connected to source 10. The slider 5 may be positioned by a two-phase electric motor 7 via a gear box 8. A limit switch 9 is operated as the slider approaches either extreme of its travel. It will thus be seen that the signal appearing at terminal 11, the second terminal of secondary 3, is the signal appearing at terminal 1, subjected to a datum shift dependent upon the setting of slider 5.

Terminal 11 is connected to the primary of a transformer 12, and in series with the secondary of a transformer 13, to one input terminal of a summing amplifier 14. The secondary of transformer 12 has an earthed centre tap and is connected across a potentiometer whose slider 15 is positioned by a two-phase electric motor 16 via a gear box 17. The slider is connected to the primary of transformer 13. Thus the signal at terminal 14 is the signal at terminal 11 amplified (or diminished) by an amount dependent upon the potentiometer setting. A further limit switch 9a is operated as slider 15 approaches either end of its travel. Switches 9 and 9a are connected in parallel to control a warning device 39.

The output of amplifier 14 is applied to an electro-mechanical transducer 18 producing an output displacement in accordance with the output signal from the amplifier 14. The output of the transducer 18 is connected to one input of a mechanical differential device 19; but this input may be clamped in a datum position, corresponding to zero signal output from amplifier 14, by a clamp 20 controlled by a solenoid 21, the clamp being applied when the solenoid is de-energized. The second input to the differential 19 is indicated at 22. This may also be clamped in a datum position by means of a clamp 23 controlled by a solenoid 24, the clamp being applied when the solenoid is energized. The output of differential 19 is connected to a motor-driven variable delivery hydraulic pump 25 whose two inlet/outlet pipes are connected to the opposite ends of the cylinder 26 of a hydraulic actuator whose piston 27 is connected to one section of the elevator (not shown). The piston is also connected to an input of a further mechanical differential 28. The elevator is thus moved at a rate and in a sense in accordance with the magnitude and sense of the output of differential 19. An output of differential 28 is connected to the second input, 22, of differential 19. The third connection to differential 28, which serves as an input or an output according to the mode of operation, is connected through a force-responsive device in the form of a set-up spring strut 29 to a member 30 which may be positioned by means of a manually-actuable control column, indicated at 31, moving against a conventional feel spring indicated at 32. The spring strut 29 includes a switch 33 which is normally closed but is opened when the tension (or compression) in the strut exceeds some predetermined value. Switch 33 is in the holding circuit of a settable relay system 34 controlling the energization of solenoids 21, 24 in such a manner that after setting and in the absence of opening of switch 33 solenoids 21 and 24 are energized but upon opening of switch 33 the solenoids become and remain de-energized until the relay system is re-set. The relay system 34 can be manually set so as to energize solenoid 21 and de-energize solenoid 24 simultaneously. The clamps 20 and 23 will then both be free.

The piston 27 also actuates an electric tachometric signal generator 35, giving a signal in accordance with rate of movement of the first elevator section ($\eta_1$ in a usual notation) and a displacement signal generator 36 giving a signal in accordance with movement of the first aileron section $\eta_1$, from generators 35 and 36, after phase-shifting if necessary, are fed back to a second input of summing amplifier 14.

The difference between the $\eta_1$ signal and one third of the sum of the corresponding signals $\eta_2$, $\eta_3$, $\eta_4$ arising in the other sub-channels, derived by means indicated at 37, is applied to one of the phase windings of each of motors 7 and 16. The second phase winding of motor 7 is fed from source 10 (via a suitable phase-shifting network) so as to be energised in quadrature with the first winding. The second phase winding of motor 16 is energised from the output of means 37, again through a suitable phase shifting network.

The sense of connection of motors 7 and 17 is such that if there is a discrepancy between the $\eta_1$ signal and the mean of the $\eta_2$, $\eta_3$, $\eta_4$ signals motor 7 operates the slider 5 to correct the discrepancy, at a very slow rate, on the basis that it is due to a datum error in the sub-channel and motor 17 operates slider 15 to correct the discrepancy on the basis that it is due to a gain discrepancy. As the signals in normal circumstances change sense at frequent intervals, a state will normally be achieved in which both the gain and datum are correctly adjusted.

The other sub-channels are all precisely similar, and only the spring struts associated with them are shown, at 29a, 29b, 29c.

The modes of operation will now be discussed

(1) Under Automatic Control

Clamp 20 free, clamp 23 held.

The elevator section will be operated under the control of the output of differential 19, which, as clamp 23 is held, acts as a "straight through" transmission from transducer 18.

The elevator segment will thus be operated in a conventional manner in accordance with the demand signal at terminal 1. Again as 23 is held, the piston movement will be transmitted through spring strut 29 to member 30 and thence control column 31.

However, if a fault arises such that there is a substantial discrepancy between the position of first elevator segment and the others, switch 33 will be opened. This will cause clamp 20 to be held and clamp 23 to be freed. Thereafter strut 29 will resume its normal length, and switch 33 will again close, but solenoids 21, 24 will not be re-energised. There will now be a "straight through" transmission of the output of differential 28 to the output of differential 19, so the elevator will be controlled to keep the output of differential 28 zero, i.e. to keep the first elevator segment in alignment with all the others, despite the fault producing the initial misalignment.

(2) Under Manual Control

All the clamps 20 will be held and all the clamps 23 free.

All the elevator segments will be positioned to maintain the outputs of all the differentials 28 zero, i.e. they will be positioned in accordance with movements applied to the control column 31, by a pilot.

(3) Manual Over-Ride of Automatic Control

To over-ride the automatic control, force is applied to column 31, to force it away from the position determined by the actuators. This opens all switches 33, releasing all clamps 23 and holding all clamps 21. Thereafter operation proceeds as under (2).

(4) Under Manual Control, But With Automatic Damping

All the clamps 20 and all the clamps 23 free.

The elevator segments will be positioned to keep the outputs of all the differentials 19 zero, i.e. they will be positioned in accordance with the automatic pilot output (to provide damping of the aircraft) and movement applied to control column 31 by a pilot, to satisfy manoeuvre demands made by him.

It will be appreciated that if any sub-channel fails by reason of excessive datum error or insufficient on excessive gain the appropriate warning device 39 will be operated.

It will also be appreciated that it might in certain circumstances be preferable to equalise the gains and datum errors of the channels by the use of force responsive devices 40 in series with spring struts 29 between differentials 28 and member 30, these force-responsive devices providing signals applied, in place of the "$\eta$" signals, as inputs to the gain and datum equalising circuits. The force responsive devices 40 (one only of which is shown) conveniently comprise springs 41 provided with electrical displacement pick-offs 42 to measure their extensions.

The gain and equalising circuits might in certain circumstances be arranged to equalise all the channels except one with the remaining channel, instead of each with the mean of all. The manner of re-arrangement of the circuit for this purpose will be obvious from consideration of the above disclosure.

Reference is made to the early work on multiple channel safety controls for automatic aircraft pilots disclosed in U.S. Patent No. 2,686,285 to F. W. Meredith and F. R. Milson, for additional background.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A servo system of the kind having a plurality of sub-channels operating corresponding outputs in accordance with a common demand quantity, the outputs being required to be in substantial agreement, each sub-channel comprising in combination an input to which a signal representing the common demand quantity is applied, an amplifier adapted to produce an output signal dependent on the demand quantity, an actuator having an output member movement of which represents the output of the sub-channel, means to control the energisation of the actuator, said control means having two operating conditions, in the first said condition being responsive to the output signal of the amplifier in the sub-channel concerned and in the second condition being responsive to any discrepancy between the position of the output member of the actuator and the positions of the output members of the actuators of the other sub-channels, and means responsive to excess of the said discrepancy above some predetermined amount to cause the energisation control means of the sub-channel concerned to assume its second condition.

2. A servo system as claimed in claim 1 wherein the different sub-channels have variable gains, and means are provided to adjust their gains to render their outputs substantially equal.

3. A servo system as claimed in claim 2 wherein the means to adjust the gain of each sub-channel comprises a signal generator associated with the actuator and providing a signal in accordance with the position of the output member of the actuator and means to control the gain of the sub-channel in accordance with any discrepancy between the magnitude of the said signal and the magnitude of the average value of the corresponding signals for the other sub-channels so as to reduce the discrepancy to zero.

4. A servo system as claimed in claim 2 wherein the different sub-channels are each provided with means for setting the datum of the signals applied to the amplifier and there is further provided means for controlling all said datum setting means to render the outputs of the sub-channels substantially equal.

5. A servo system as claimed in claim 3 wherein in each sub-channel there is further provided means for setting the datum of the signals applied to the amplifier and means for controlling the datum setting means automatically in accordance with any said discrepancy between the magnitude of the said signal and the magnitude of the average value of the corresponding signals for the other sub-channels so as to reduce the discrepancy towards zero.

6. A servo system as claimed in claim 4 wherein in each sub-channel the means to adjust the gain and set the datum of the signals applied to the amplifier comprise a force-responsive device effectively connected to the output member of the actuator and to the output members of the actuators of the other sub-channels and providing a response in accordance with any discrepancy between the position of the output member of the actuator and the positions of the output members of the actuators of the other sub-chanels.

7. A servo system as claimed in claim 1 wherein in each sub-channel the means to control the energisation of the actuator comprise a first mechanical differential device having first, second, and third elements the first element being connected to the input of the actuator, and in the first said condition the second element being moved in accordance with the said output signal of the amplifier and the third element being held in a datum position, and in the second said condition the second element being held in a datum position and the third element being moved in accordance with the said discrepancy.

8. A servo system as claimed in claim 7 wherein in each sub-channel the means to control the energisation of the actuator also comprise a second mechanical differential device having fourth, fifth and sixth elements, the fourth element being connected to the output member of the actuator, the fifth element being connected to the third element, and the sixth element being connected to the corresponding elements of the other sub-channels.

9. A servo system as claimed in claim 8 wherein in each sub-channel the means responsive to excess of the said discrepancy comprise a further force-responsive device and a further member common to all the sub-channels, the said device being connected between the sixth element and the further member, and controlling holding means for the seocnd and third elements so that in the first condition the third element only is held in its said datum position, and in the second condition the second element only is held in its said datum position.

10. A servo system as claimed in claim 9 wherein said further member may be actuated manually thereby causing the means to control energisation of the actuator in each sub-channel to adopt their second condition so that the output of the actuators is in accordance with movements of said further member.

11. A servo system as claimed in claim 10 wherein manual control means are provided in each sub-channel to cause the energisation control means to assume a third condition in which neither the second element nor the third element are held in their datum positions so that the actuator is responsive both to the output signal of the amplifying stage and to movements of said further member.

12. A servo system comprising a plurality of sub-channels having a common input to which a demand quantity may be applied and separate outputs which are required to be in substantial agreement, there being a member which is positioned in dependence upon the outputs of all the sub-channels and each sub-channel comprising an amplifier adapted to produce an output signal dependent on the demand quantity, an actuator for operating the sub-channel output and means for controlling the energization of the actuator, said means being coupled to the output of the amplifier, to the actuator and to said member and having two conditions of operation in the first of which the output of the amplifier is coupled to the actuator to energize it and the actuator is coupled to said member to tend to position it in dependence upon the output of the actuator and in the second of which the actuator is driven in dependence upon any lack of correspondence between its output and the position of said member as positioned by the actuators of the other sub-channels, each sub-channel further including means responsive to lack of correspondence between the position of said member and the output of its actuator to cause said energization control means to change to its second condition if said lack of correspondence exceeds a predetermined value.

13. A multiple channel safety control for servo systems for the actuation of aircraft control surfaces, comprising a signal input means, a plurality of sub-channels connected to said signal input, an amplifier for each said sub-channel, an actuator means for each said sub-channel constructed to act upon a control surface of an aircraft, control means for each sub-channel having two operating conditions connected to control energization of said actuator means, and being so constructed that in one of said conditions said control means is responsive to said signal input as modified by said amplifier stage and in the other of said conditions said control means is responsive at least in part to the mean value of said signal input as modified by said other amplifiers and means responsive to a predetermined difference between said modified signal supplied by said one amplifier and said mean value of said modified signals supplied by said other amplifiers to cause said energization control means to assume said other of said operating conditions.

14. A servo system of the kind having a plurality of sub-channels operating corresponding outputs in accordance with a common demand quantity, the outputs of the sub-channels being required to be in substantial agreement, in which system each sub-channel has an input to which in operation a signal representing the common demand quantity is applied, a servo amplifier coupled to the sub-channel input to receive said signal as a demand signal and adapted to produce an output signal in accordance with the demand signal, an actuator for positioning an output member the position of which is the output of the sub-channel, and means for controlling the operation of the actuator, there being provided in addition a further member common to all the sub-channels and each sub-channel control means having first and second operating conditions and including linking means coupling it to the further member and means responsive to increase of any discrepancy between the position of the output member and the position of the further member above a predetermined value to cause the control means to change from its first condition in which it normally operates to its second condition, the first operating condition being such that the actuator is controlled to position the output member in accordance with the output of the amplifier and the linking means transmits a force to the further member whereby the further member is positioned in dependence upon the positions of the output members of all sub-channels of which the control means are in the first operating condition, and the second operating condition being such that the linking means is arranged to transmit a movement in accordance with the position of the further member and the actuator is controlled to position the output member in accordance with any discrepancy between the position of the output member and the position of the further member as represented by said movement.

15. A servo system as claimed in claim 14 wherein the sub-channels have variable gains and there is provided means for adjusting their gains automatically in such a manner as to tend to render their outputs substantially equal.

16. A servo system as claimed in claim 15 in which the means for adjusting the gain of each sub-channel includes a signal generator associated with the actuator for generating a first signal in accordance with the position of the output member, means for generating a second signal representing the magnitude of the average value of the corresponding signals for the other sub-channels, and means for controlling the amplitude of the demand signal applied to the servo amplifier in accordance with any discrepancy between the magnitude of the first and second signals so as to reduce the discrepancy towards zero.

17. A servo system as claimed in claim 14 in which the different sub-channels are each provided, in the coupling between the servo amplifier and the sub-channel input, with means for shifting the datum of the signals applied to the servo amplifier to correct for datum errors in the sub-channels in such a manner as to tend to render their outputs substantially equal.

18. A servo system as claimed in claim 17 in which each sub-channel is provided with means for shifting said datum automatically in accordance with the discrepancy between the output of the sub-channel and the average value of the outputs of all the other sub-channels in such a manner as to reduce the discrepancy towards zero.

19. A servo system as claimed in claim 14 wherein the sub-channels have variable gains and there is provided means for adjusting their gains automatically in such a manner as to tend to render their outputs substantially equal and in which the different sub-channels are each provided, in the coupling between the servo amplifier and the sub-channel input, with means for shifting the datum of the signals applied to the servo amplifier to correct for datum errors in the sub-channels in such a manner as to tend to render their outputs substantially equal, said means for adjusting the gain and shifting said datum in each sub-channel being actuated by signals derived from a force-responsive device effectively connected to the output member of the actuator and to the output members of the actuators of the other sub-channels and providing a signal in accordance with discrepancy between the output member of the actuator and the output members of the actuators of the other sub-channels.

20. A servo system as claimed in claim 14 in which each sub-channel control means includes a first mechanical differential device having first, second and third elements, the first element being connected to the input of the actuator, the second element being coupled to means for positioning it in accordance with the output of the amplifier but being clamped still when the control means is in the second operating condition, and the third element being coupled to means for positioning it in accordance with any discrepancy between the position of the output member and the position of said further member but being clamped still when the control means is in the first operating condition.

21. A servo system as claimed in claim 20 in which each sub-channel control means further includes a second mechanical differential device having fourth, fifth and sixth elements, the fourth element being connected to the output member of the actuator, the fifth element being connected to the third element, and the sixth element being connected to said further member by said linking means.

22. A servo system as claimed in claim 21 in which, in each sub-channel, the linking means includes a force-responsive device coupled between the sixth element and the further member, the force-responsive device controlling means for clamping the second and third elements still and being arranged to operate so that in the first operating condition the third element only is clamped and in the second operating condition the second element only is clamped.

23. A servo system as claimed in claim 22 in which there is provided means for positioning the further member manually to cause the control means in all the sub-channels to adopt their second operating conditions so that the output members of all the actuators are positioned in accordance with any movements of the further member.

24. A servo system as claimed in claim 23 in which each sub-channel is provided with means for causing the control means to assume a third operating condition in which neither the second nor the third element is clamped, whereby the actuator then operates to position the output member both in accordance with the output of the amplifier and in accordance with any movements of the further member.

References Cited in the file of this patent

UNITED STATES PATENTS

| | | |
|---|---|---|
| 1,907,132 | Thurston | May 2, 1933 |
| 2,083,701 | Fouquet | June 15, 1937 |
| 2,686,285 | Meredith et al. | Aug. 10, 1954 |
| 2,750,553 | Anderson | June 12, 1956 |
| 2,796,569 | McDonald et al. | June 18, 1957 |
| 2,798,992 | Adler et al. | July 9, 1957 |
| 2,840,771 | Kamm | June 24, 1958 |
| 2,883,594 | Alberts | Apr. 21, 1959 |